United States Patent [19]

Cimbak

[11] Patent Number: 5,542,596
[45] Date of Patent: Aug. 6, 1996

[54] VAPOR PHASE SOLDERING MACHINE HAVING A TERTIARY COOLING VAPOR

[75] Inventor: Joseph J. Cimbak, West Hartland, Conn.

[73] Assignee: United Technologies Corp., Windsor Locks, Conn.

[21] Appl. No.: 359,431

[22] Filed: Dec. 20, 1994

[51] Int. Cl.⁶ .................................................. B23K 1/015
[52] U.S. Cl. .......................... 228/234.2; 432/77; 432/197
[58] Field of Search ................................. 228/42, 234.2; 432/197, 77

[56] References Cited

U.S. PATENT DOCUMENTS

| | | |
|---|---|---|
| 3,680,762 | 8/1972 | Kondo . |
| 3,874,068 | 4/1975 | Cook . |
| 3,882,596 | 5/1975 | Kendziora et al. . |
| 3,904,102 | 9/1975 | Chu et al. . |
| 4,032,033 | 6/1977 | Chu et al. ................. 228/234.2 X |
| 4,115,601 | 9/1978 | Ammann et al. ............. 228/234.2 X |
| 4,187,974 | 2/1980 | Mahajan ..................... 228/234.2 |
| 4,390,120 | 6/1983 | Broyer . |
| 4,489,508 | 12/1984 | Carlson, Jr. ............... 228/234.2 X |
| 4,638,938 | 1/1987 | Yarne et al. . |
| 4,676,069 | 6/1987 | Miyake . |
| 4,681,249 | 7/1987 | Kondo . |
| 4,692,114 | 9/1987 | Waldron et al. . |
| 4,801,069 | 1/1989 | Ankrom et al. . |
| 4,838,476 | 6/1989 | Rahn . |
| 4,840,305 | 6/1989 | Ankrom et al. . |
| 4,979,664 | 12/1990 | Lyons et al. . |
| 5,111,991 | 5/1992 | Clawson et al. . |
| 5,123,164 | 6/1992 | Shaheen et al. . |
| 5,259,546 | 11/1993 | Volk . |

*Primary Examiner*—Kenneth J. Ramsey
*Attorney, Agent, or Firm*—Richard H. Kosakowski, Esq.; Holland & Bonzagni, P.C.

[57] ABSTRACT

An improved vapor phase soldering machine includes a pair of separate vessels having an open fluid communication path in a wall separating the two vessels. The first vessel contains a liquid mixture of a primary vapor and a secondary vapor, while the second vessel contains a liquid mixture of the primary vapor and a tertiary vapor. Heating means continuously boils the two mixtures to create corresponding vapors within the vessels. The secondary vapor is disposed on top of the primary vapor in the first vessel, while the tertiary vapor is disposed on top of the primary vapor in the second vessel. The printed circuit board with surface mounted devices attached thereto by solder paste is introduced into the secondary vapor of the first vessel for preheating the board and the devices. Then, the board is moved into the primary vapor which is at a temperature high enough to melt the solder paste, thereby forming a bond between the devices and the printed circuit board. Then the circuit board is routed through the opening in the wall separating the two vessels and into the primary vapor of the second vessel and then into the tertiary vapor within the second vessel. The tertiary vapor is held at, near or below ambient temperature to provide rapid cooling and hardening of the soldered connections.

20 Claims, 4 Drawing Sheets

VAPOR PHASE SOLDERING MACHINE HAVING A TERTIARY COOLING VAPOR

BACKGROUND OF THE INVENTION

The present invention relates to a vapor phase soldering machine, and more particularly to a vapor phase soldering machine that utilizes a tertiary cooling vapor to provide for rapid cool-down and hardening of the molten soldered connections of surface mounted devices to a printed circuit board, thereby providing for higher integrity connections.

In connecting various types of electronic components, both leaded and leadless, to a printed circuit board, various methods have been utilized to obtain good quality soldered joints. The most basic method is to use a hand-held soldering iron and a spool of solder wire. The solder wire generally contains a compound mixed within the solder known as "flux". The flux performs a cleaning action as the solder joint is being made. The person making the soldered connection touches all elements of the joint simultaneously with the tip of the soldering iron. The tip is normally held at a temperature of approximately 600°–800° F. Once the joint is heated to above the melting point of the solder wire being used (typically 500°–575° F.), the person feeds the solder wire into the joint, thereby melting it and causing it to flow around the joint elements, such as the lead from the component and the corresponding plated through hole in the circuit board. Once the correct amount of solder has been applied, the person removes the soldering iron tip from the joint and the joint cools via convective, conductive and radiant cooling.

This cooling action causes the molten solder to solidify within 3–5 seconds. This cooling rate is rapid enough to effect a joint which causes the solder to properly fuse to all of the joint elements. A typical test for a properly soldered connection is a shiny, smooth and lustrous appearance with a slightly concave configuration, even when viewed under magnification. Perhaps the most telling characteristic of a good solder joint is a fine grain structure, together with the bright finish. On the other hand, a weak solder joint is characterized by a coarse grain structure having crystal-like formations. Typical military specifications for electronic equipment prepared by government contractors base their pass/fail inspection criteria of soldered connections upon this visual, subjective test. It is known that the quicker the cooling rate, the better the metallurgical grain structure of the resulting joint. Further, it is known that a cooling rate of 3–5 seconds forms such a small grained structure. It is this small grain structure that causes the shiny, smooth and lustrous appearance of the soldered joint.

However, hand soldering is slow and tedious at best, and can produce only one soldered connection at a time by the worker. Therefore, it is known in the electronics assembly industry to utilize more automated methods of simultaneously soldering a plurality of electrical connections. These automated soldering technologies are categorized by the package design of electrical components (i.e., joint elements) that are to be soldered.

The first type of package design of electrical components is the oldest category and is referred to as a "leaded component" design. That is, each component utilizes lead wires that project from the body of the component. For example, discrete elements such as resistors, capacitors and diodes have lead wires exiting the body either axially or radially. Also, integrated circuits have pins arranged around the perimeter of the integrated circuit package. With a leaded component, the lead is inserted into connective holes formed in a printed circuit board. These holes are drilled through the printed circuit board, which is usually made of an insulative material such as fiberglass. The plated through holes are plated with an electrically-conductive material, such as a combination of tin-lead, to allow continuity between the hole and various conductive traces on the printed circuit board surfaces that connect together the components on the board. When the component wire lead is soldered to the plated through hole, the resulting joint becomes an electrical conductor.

However, while hand soldering typically produces a sound metallurgical joint, the relatively large amount of time needed to solder all of the connections on a circuit board manually by hand precludes hand soldering from usage where a large number of assembled and soldered printed circuit boards must be produced, each with a multiple of connections.

Therefore, it is known to use an automated technology for soldering leaded components into plated through holes on printed circuit boards. A common technique is wave soldering, which is carried out using a machine having a constant speed conveyor. The printed circuit board with the components assembled in place, but not yet soldered, goes onto the conveyor in a specially designed holding fixture. The conveyor is started and the printed circuit board enters the wave soldering process.

Initially, the printed circuit board rides over a turbulating wave of liquid flux. The flux is a compound that cleans all of the elements of a solder joint. In the next step, the printed circuit board enters a preheat area of the wave soldering machine where heat lamps raise the temperature of the printed circuit board. This preheat area conditions the printed circuit board to approximately 300° F., to prevent damaging thermal shock to the board and components when the board enters the next step of the process.

Next, the board travels over a turbulating wave of molten solder. All component wire leads projecting through the plated through holes in the printed circuit board are simultaneously soldered as the solder from the turbulating waves wicks up the leads and into the holes. Once the board travels over the turbulating solder wave, the solder joints cool rapidly, either through the process of natural convection, conduction and radiation, or through forced air convection cooling (e.g., similar to a fan).

A wave soldered connection typically cools as rapidly as a hand soldered connection; i.e., approximately in 3–5 seconds. Similar to a hand soldered joint, the joint produced by wave soldering is "wetted" and has a shiny, smooth and lustrous appearance due to the small metallurgical grain structure of the solder joint. Therefore, wave soldered joints generally meet all military specification visual inspection requirements.

A more modern type of component technology is known as surface mounted devices ("SMD"). These components are designed without wire leads protruding from the body of the component. Instead, these SMD components incorporate integral pads that are directly attached to the body of the component. These pads serve to mount the SMD to the printed circuit board, thus making all necessary connections.

Surface mounted printed circuit boards have corresponding mating pads disposed on one or more board surfaces that coincide with the component mounting pads. A solder paste is applied to the printed circuit board pads, either by screen printing, stenciling, or dispensing with a syringe. The solder paste is applied to the printed circuit board pads prior to the placement of the SMDs onto the board. Once the components are placed onto the board, the board is then soldered utilizing one of a number of techniques, among the most popular being vapor phase soldering.

The vapor phase soldering process begins once all of the SMDs have been placed on a printed circuit board that has the solder paste applied at the appropriate locations on the board. In a typical prior art vapor phase soldering machine, as exemplified in U.S. Pat. No. 3,904,102, the board is placed in a wire basket that descends initially downward into the machine. The printed circuit board contacts a preheat area that comprises a vapor, called a secondary vapor, that is approximately 300° F. This exemplary temperature is usually less than that required to actually melt the solder paste.

After the temperature conditioning of the printed circuit board and the components thereon in the secondary vapor portion of the machine, the printed circuit board descends further downward into the machine and enters a vapor, called a primary vapor, with a temperature equal to or greater than the melting temperature of the solder paste. This primary vapor liquifies the solder paste and causes the component connection pads and the corresponding printed circuit board mounting pads to fuse together, thereby forming a plurality of discrete electrically continuous soldered connections. Once the solder paste has melted, the printed circuit board is moved back upward through the secondary vapor and out of the machine into the ambient atmospheric temperature. This causes the solder joints to cool, but rather slowly, as compared to both hand soldering and wave soldering. The typical solder joint cool-down time for the aforedescribed prior art vapor phase soldering machine is approximately 10–15 seconds.

This slow cool-down is inherent in the design of this prior art vapor phase soldering machines. When using hand soldering techniques, the heat required to reflow the solder is applied at a point on the board (i.e., the actual joint) using a pointed soldering iron tip. Only the area in the immediate vicinity of the joint being soldered heats up to the melting temperature. The rest of the circuit board remains at or near room temperature. Thus, the cooler circuit board surrounding the soldered joint acts as a heat sink to aid in the rapid cooling of the hand soldered joint. As mentioned hereinbefore, a hand soldered joint cools in approximately 3–5 seconds.

In contrast, vapor phase soldering machines, like those described in the aforementioned prior art '102 patent, are entirely immersed in the primary vapor that is hot enough to reflow solder. This means that the entire printed circuit board heats up to this temperature. Thus, to cool the individual joints that have just been soldered, the entire circuit board must be cooled. The '102 patent is problematic in that the printed circuit board must pass back through the secondary vapor before exiting the machine, where the board can cool. This dwell time in the secondary vapor contributes to the overall time in cooling the molten soldered joints. The prior art is devoid of teaching that provides for cooling of vapor phase soldered joints at a rate that is equivalent to that achieved by hand or wave soldering.

Due to the very slow cool-down cycle (i.e., 10–15 seconds) achievable by typical prior art vapor phase soldering machines, the resulting solder joints formed are metallurgically large grained, and have a low luster, non-shiny, grainy appearance. However, it should be noted that, even though these vapor phase solder joints may not meet military specification visual inspection criteria, they, nonetheless, may perhaps be of good quality, and be reliable soldered connections. But, because of the process-driven appearance of vapor phase soldered joints, it is difficult to correlate military specification pass/fail criteria to the relatively younger vapor phase soldering process based on military specification requirements for smooth, shiny and lustrous joints.

Accordingly, it is a primary object of the present invention to provide an improved vapor phase soldering machine that provides for a cool-down time of the soldered connections that is equivalent to that achievable using hand or wave soldering.

It is a general object of the present invention to provide an improved vapor phase soldering machine that provides for high quality solder joints as determined by a subjective visual inspection of the joints.

It is another object of the present invention to provide an improved vapor phase soldering machine that provides for high speed, economical soldering of printed circuit boards having a plurality of soldered connections.

It is yet another object of the present invention to provide an improved vapor phase soldering machine that provides high quality solder joints between surface mounted devices and the corresponding locations on a surface of a printed circuit board.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has invented an improved vapor phase soldering machine.

In a preferred embodiment, the machine comprises a pair of separated mixture tanks or vessels. At the bottom of each tank is disposed a liquid mixture. The first tank contains a primary liquid and a secondary liquid in a mixture. The second tank contains the primary liquid and a tertiary liquid in another mixture. A heater disposed at the bottom of each tank continuously boils the respective liquids within each mixture to establish, in each tank, a lower layer of a primary vapor having a temperature that is at least equal to the temperature at which a soldering operation is to be performed. The primary vapor in each tank is created by the boiling of the corresponding primary liquid in each tank. The primary vapor in each tank has a density greater than that of the ambient air. In the first tank above the layer of primary vapor is floated a layer of secondary vapor created by the boiling of the secondary liquid. The secondary vapor has a density between that of the primary vapor and the atmosphere. In the second tank above the layer of the primary vapor is floated a layer of a tertiary vapor created by the boiling of the tertiary liquid. The tertiary vapor is of a density that, similar to the secondary vapor, is between that of the primary vapor and the atmosphere. However, in contrast to the temperature of the secondary vapor which is relatively much greater than room temperature, the temperature of the tertiary vapor is preferably at, near or less than room temperature.

A wall or baffle is provided that separates the two tanks. An opening is provided in the wall below the upper boundary of the primary vapor in each tank. The opening is configured structurally and with condensing coils to prevent the secondary and tertiary vapors from passing through the opening and mixing with each other.

In operation, a conveyor moves a printed circuit board, having mounted thereon surface mounted devices to be soldered to the board, into the secondary vapor through the top of the first tank. The surface mounted devices interface to corresponding locations on a surface of the printed circuit board by a solder paste that is to be melted or reflowed by the vapor phase soldering machine of the present invention to effect a connection of the surface mounted devices to the printed circuit board. The conveyor moves the printed circuit board downward through the secondary vapor in the first tank, where the printed circuit board and the surface mounted devices are heated to a temperature below that which melts the solder paste. This preheating of the board by latent heat of vaporization in the secondary vapor heat-conditions the board to prevent thermal shock prior to entering the primary vapor.

Then, the conveyor moves the printed circuit board into the primary vapor in the first tank, where the solder paste is then heated by latent heat of vaporization of the primary vapor to a temperature high enough to reflow or melt the solder. The conveyor follows a path through the opening between the tanks and into the primary vapor in the second tank. The conveyor then moves upward in the second tank into the tertiary vapor where, because the tertiary vapor is at or below ambient temperature, the molten solder connecting the surface mounted devices and the printed circuit board is quickly cooled and hardened. The hardened solder bonds to both the printed circuit board and the surface mounted devices, thereby effecting an electrical and mechanical connection therebetween. The conveyor then moves the printed circuit board out of the second tank.

DETAILED DESCRIPTION OF THE PREFERRED EMBODIMENTS

Figure 1:
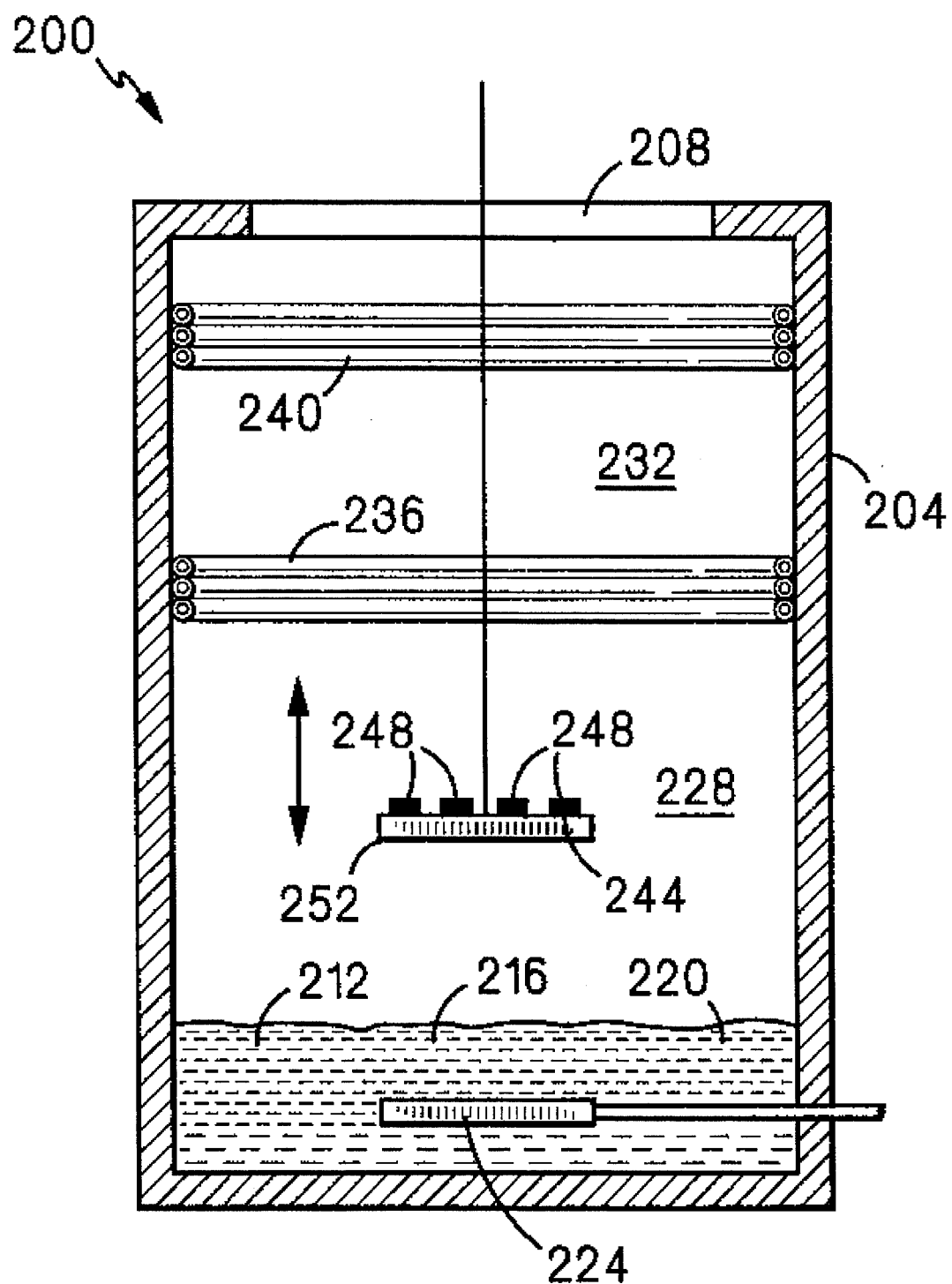
FIG. 1 is a partial cross-sectional illustration, in elevation, of a prior art vapor phase soldering machine having primary and secondary vapors.

Referring to the drawings in detail, a preferred embodiment of an improved vapor phase soldering machine is illustrated therein and generally designated by the reference numeral 100. The machine 100 includes a pair of tanks or vessels 104, 108 having an opening 112 in a wall or baffle 116, 120 separating the vessels 104, 108, the opening 112 being provided in a lower wall portion 120. A liquid mixture 124 is disposed at the bottom of the first tank 104. The mixture 124 contains a first quantity of a primary liquid 128 mixed together with a secondary liquid 132. The second tank 108 contains a liquid mixture 136 of a second quantity of a primary liquid 140, either the same primary liquid 128 in the first tank 104 or a different primary liquid, together with a tertiary liquid 144. A pair of heaters 148, 152 are disposed at the bottom of each tank 104, 108 to continuously boil the liquid mixtures 124, 136 in each tank 104, 108 to create a primary vapor 156, 160 in each tank 104, 108 that extends up from the liquid 124, 136 to a predetermined elevation in each tank 104, 108. Above the primary vapor 156 in the first tank 104 is a secondary vapor 164, while above the primary vapor 160 in the second tank 108 is a tertiary vapor 168. These vapors 164, 168 result from the continuous boiling of the corresponding liquids 124, 136 in each tank 104, 108. Condensing coils 172–184 are provided at various locations within each tank 104, 108 to condense the vapors 156–168. Also, the opening 112 has a certain structure, together with additional condensing coils 188 disposed near the opening 112 to prevent the secondary and tertiary vapors 164, 168 from mixing with each other.

Referring now to FIG. 1, there illustrated is a prior art vapor phase soldering machine 200, which may be that described and illustrated in U.S. Pat. No. 3,904,102, which is hereby incorporated by reference. In FIG. 1 is illustrated a single vessel or tank 204 having an opening 208 at the top, and having a quantity of a liquid mixture 212 disposed at the bottom. The liquid mixture 212 comprises a primary liquid 216 and a secondary liquid 220. A heater 224 is disposed within the liquid mixture 212 to continuously boil the liquid 212 to create corresponding primary and secondary vapors 228, 232. A primary set of cooling coils 236 is disposed intermediate the top and bottom of the vessel 204. The coils 236 receive a circulating cooling medium from a source not shown. A secondary set of cooling coils 240 is disposed adjacent the upper portion of the vessel 204. The coils 240 receive a circulating cooling medium from a source not shown.

In operation, the mixture 212 of the primary and secondary liquids 216, 220 is brought to a boil by the heater 224. The secondary liquid 220 will boil off first, since it has a lower boiling point than that of the primary liquid 216. It is to be noted that the mixture 212 of the primary and secondary liquids 216, 220 is a non-azeotropic mixture of these liquids 216, 220. As the secondary liquid 220 boils, the saturated vapors form secondary vapors 232 that fill the vessel 204 up to a certain level, depending upon the quantity of the secondary liquid 220 in the mixture 212. After the secondary liquid 220 has boiled off, the remaining primary liquid 216 in the mixture 212 is further boiled to create hot saturated vapors referred to as primary vapors 228. These primary vapors 228 are denser than the secondary vapors 232. Thus, the lighter secondary vapors 232 are pushed upwardly in the vessel 204 by the primary vapors 228. These secondary vapors 232 flow on top of the primary vapors 228 and provide a vapor blanket thereover.

The proportion of primary and secondary liquids 216, 220 in the liquid mixture 212 is selected and determined by several factors, including the geometry of the vessel 204, the location and elevation of the primary and secondary sets of condensing coils 236, 240 in the vessel 204, and the desired thickness of the layer of the secondary vapor 232 over the primary vapor 228. The proportions of the primary and secondary liquids 216, 220 in the mixture 212 are chosen such that, at equilibrium after start-up, there exists in the vessel 204 primary vapors 228 that extend up through a portion of the primary set of cooling coils 236. Above that exists a mixture of primary and secondary vapors 228, 232 extending up to the top of the primary set of cooling coils 236. This is followed by a layer of saturated secondary vapors 232 extending upward to a portion of the secondary set of cooling coils 240. The primary set of cooling coils 236 is maintained at a temperature below the condensation temperature of the primary vapor 228. Further, the secondary set of cooling coils 240 is maintained at a temperature below the condensation temperature of the secondary vapor 232. That is, both sets of coils 236, 240 are maintained below the boiling points of the respective liquids 216, 220.

In operation in this prior art scheme, an article to be soldered, such as a printed circuit board 244 and a number of surface mounted devices 248 and/or traditional leaded components 248, is prepared by assembling these devices 248 and components 248 to the circuit board 244 with a solder paste in a hardened form disposed between the board 244 and each device 248 and component 248. The board is then placed in a basket 252 and lowered into the vessel 204 from the top. The printed circuit board 244 initially encounters the secondary vapor 232 which is at a temperature greater than ambient, yet less than that required to melt or reflow the solder. This secondary vapor 232 provides a form of preheating of the printed circuit board 244 to prevent any thermal shock to the board 244 and the components 248. After a suitable period of time, the board 244 is then lowered into the primary vapor 228 that is of a temperature that is at least high enough to melt or reflow the solder paste. Once the solder paste has melted, the board 244 is then moved upwardly back through the secondary vapor 232 and out into ambient through the top of the vessel 204.

However, as described hereinbefore in the Background of the Invention section, this prior art scheme does not provide for a fast enough cool-down rate of the soldered connections, in contrast to the improvement of the present invention. That is, the prior art vapor phase soldering machine 200 of FIG. 1 provides a cool-down or hardening of the molten soldered connections of about 10–15 seconds. This is substantially longer than the required 3–5 second cool-down rate achieved by hand or wave soldering techniques. The results are solder joints that are non-shiny and large grained, although perhaps some of them are metallurgically sound. However, due to the subjective inspection criteria often involved with electronic apparatus provided to the government, such visual characteristics of the solder joints may require an inspector to reject all of the connections.

Figure 2:
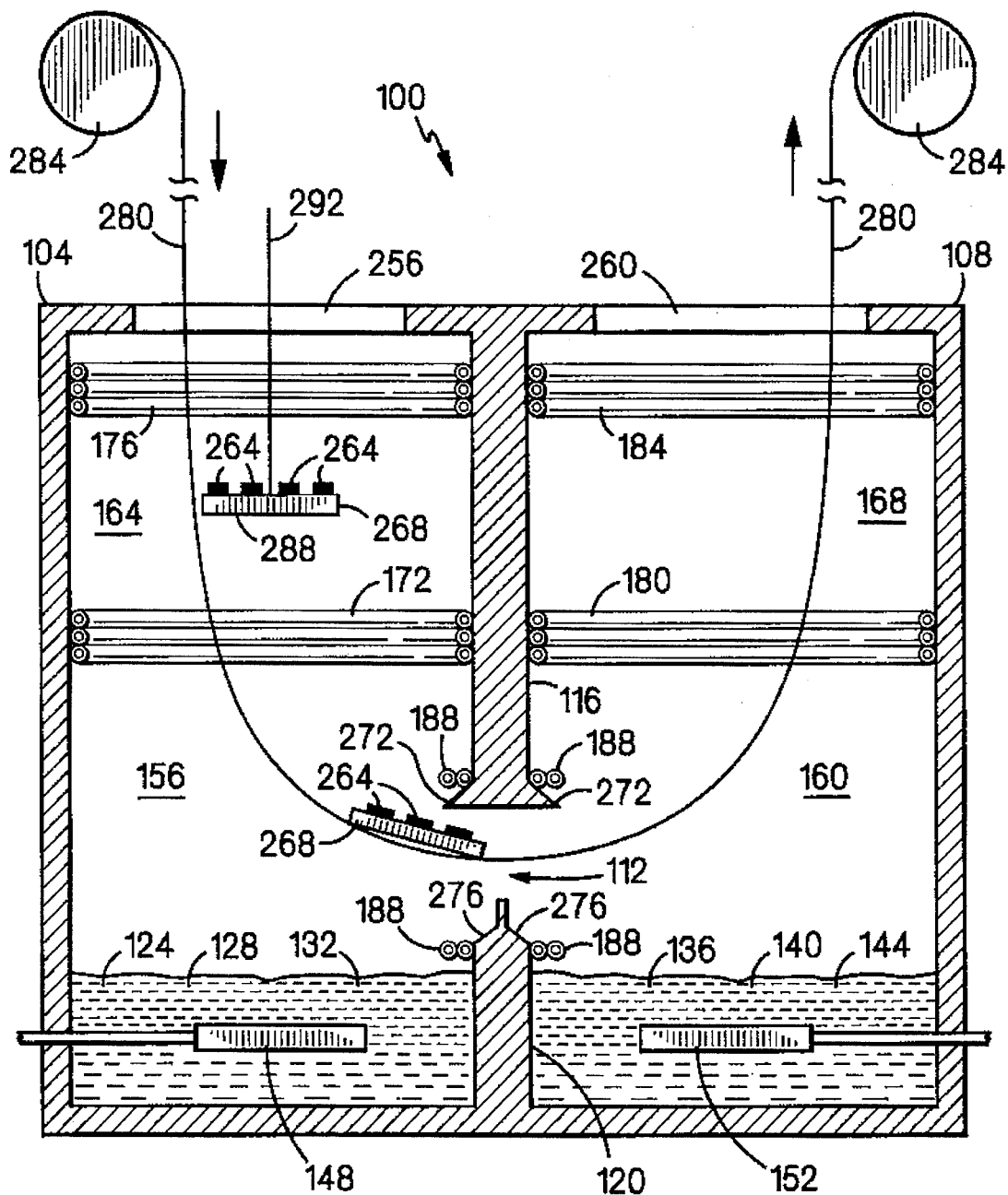
FIG. 2 is a partial cross-sectional illustration, in elevation, of a vapor phase soldering machine in accordance with the present invention, having primary, secondary and tertiary vapors.

As a result, the Applicant has created an improved vapor phase soldering machine 100. Referring now to FIG. 2, there illustrated is the improved vapor phase soldering machine 100 of the present invention. The machine 100 comprises a pair of adjacent tanks or vessels 104, 108 having an opening 112 between a wall or baffle 116, 120 separating the two tanks 104, 108 at a bottom wall portion 120. This allows the lower region of each tank 104, 108 to be, theoretically, in fluid communication with each other. However, as will be described hereinafter in greater detail, any fluid is prevented from crossing through the opening and intermixing between the chambers by the physical structure of the wall 116, 120 near the opening 112, plus the usage of condensing coils 188 in the vicinity of the opening 112.

Each tank 104, 108 has an opening 256, 260 at the top. Disposed at the bottom of the first tank 104 is a liquid mixture 124 containing a first quantity of a primary liquid 128 mixed with a secondary liquid 132. A heater 148 is provided to continuously boil this mixture to create vapors. The heater 148 may be electrically operated. In a similar manner, at the bottom of the second tank 108 is disposed a liquid mixture 136 of a second quantity of the primary liquid 140 mixed with a tertiary liquid 144. A heater 152 is provided to continuously boil this liquid mixture 136 to create vapors 160, 168.

A primary set of cooling or condensing coils 172, 180 is provided in each tank 104, 108 at a predetermined elevation above the bottom of the tank 104, 108. Disposed above these primary cooling coils 172 in the first tank 104 is a set of secondary cooling coils 176. These cooling coils 176 are disposed just below the opening 256 at the top of the first tank 104. In a similar manner, the second tank 108 contains a set of tertiary cooling coils 184 disposed above the primary cooling coils 180 and just below the opening 260 at the top of the second tank 108. A fifth set of cooling coils 188 is provided adjacent the wall 116, 120 separating the two tanks 104, 108 and above and below the opening 112 in the wall 120. The temperature of the primary cooling coils 172, 180 is set below the condensation temperature of the primary liquid 128. Similarly, the temperature of the secondary cooling coils 176 is set below the condensation temperature of the secondary liquid 132. Also, the temperature of the tertiary cooling coils 184, along with the temperature of the fifth set of cooling coils 188, is set below the condensation temperature of the tertiary liquid 144.

The primary liquid 128, 140 disposed in both tanks 104, 108 is characterized in that it has a boiling point at atmospheric pressure that is at least equal to, and may be slightly greater than, the temperature required for vapor phase soldering of components 264 onto a circuit board 268. That is, its vapor temperature must equal or exceed the melting point of the solder paste disposed between the devices 264 and the corresponding locations on the circuit board 268. Further, the primary liquid 128, 140 should produce a saturated vapor that is denser than air at atmospheric pressure, and has a sharply defined and substantially constant boiling point. The primary liquid 128, 140 should also not form an azeotrope either with the secondary liquid 132 in the first tank 104 or with the tertiary liquid 144 in the second tank 108. Finally, the primary liquid 128, 140 desirably produces a saturated vapor 156, 160 which is non-oxidizing, chemically-stable and inert, non-toxic and non-flammable.

In an exemplary embodiment of the present invention, a primary liquid 128, 140 is selected from a group of liquids known generally as fluorocarbons. These liquids are commercially-available from several sources, including DuPont or 3M. In an exemplary embodiment, the primary liquid 128, 140 has a boiling point (i.e., a vapor temperature) of approximately 435° F.

In contrast, the secondary liquid 132 has a lower boiling point at atmospheric pressure than the primary liquid 128, 140. Also, this secondary liquid 132, when boiled, produces a vapor 164 at atmospheric pressure that is less dense than the saturated vapor 156, 160 of the primary liquid at this same pressure. Yet, the secondary vapor 164 is denser than air. Similar to the primary liquid 128, 140, the secondary liquid 132 desirably produces a saturated vapor 164 which is non-oxidizing, chemically-stable and inert, non-toxic and non-flammable. In an exemplary embodiment of the present invention, the secondary liquid 132 was chosen from a group of liquids known generically as halogenated hydrocarbons, such as those commercially available from DuPont or 3M. For example, the secondary liquid 132 may comprise commercially trichlorotriflouroethane, also known commercially as Freon-113 or R113. This secondary liquid has a boiling point of approximately 117° F.

The tertiary liquid 144 has a boiling point (i.e., vapor temperature) that is lower than that of the secondary liquid 132. Preferably, the vapor temperature of the tertiary vapor 168 is at approximately ambient temperature or lower. However, the temperature of the tertiary vapor 168 may be somewhat greater than ambient. For example, if ambient is 72° F., the tertiary vapor 168 may range as high as 80° F. This temperature is selected because the tertiary vapor 168 provides the rapid cool-down of the printed circuit board 268 and its associated components 264 and the molten solder therebetween as the board 268 exits the primary vapor 160 into the tertiary vapor 168. The tertiary vapor 168 should ideally have a density greater than ambient. In a similar manner to the secondary vapor 164, this density requirement of the tertiary vapor 168 is such that both the secondary and tertiary vapors 164, 168 act as blankets above the primary vapor 156, 160 in each tank 104, 108 to prevent the primary vapor 156, 160 from escaping through the openings 256, 260 at the top of each tank 104, 108. Also, the tertiary and secondary vapors 168, 164, by being denser than the atmosphere, prevent these vapors from also escaping into the atmosphere. For example, the tertiary liquid 144 may comprise dichloromonoflouromethane, also known commercially as Freon-21; dichlorotetraflouroethane, also known commercially as Freon-114; or trichloromonoflouromethane, also known commercially as Freon-11 or Careene-2. Each of these liquids has a density greater than air, but less than the density of the primary liquid 140. Also, each liquid has a boiling point at, near, or below ambient temperature (assuming ambient is 72° F.).

The fifth set of cooling coils 188 (i.e., baffle condensing coils 188) prevents the primary and secondary vapors 156, 164 in the first tank 104 from migrating over into the second tank 108. At the same time, these cooling coils 188 prevent the primary and tertiary vapors 160, 168 in the second tank 108 from migrating over into the first tank 104 through the opening 112. Also, the upper wall portion 116 above the opening is configured with a drip cap 272 to direct the condensate dripping off of the coils 188 from intermixing into the opposite tank 104, 108. Further, the sloping surfaces 276 at the lower wall portion 120 also prevent any condensate dripping down from the cooling coils 188 from migrating over into the opposite tank 104, 108.

Upon start-up of the machine 100 of FIG. 2, the corresponding heater 148, 152 disposed in each tank 104, 108 continuously boils the liquid 124, 136 therein. Because the secondary liquid 132 has a lower boiling point than the primary liquid 128, the secondary vapor 164 will be initially formed in the first tank 104 and will permeate upward to approximately the mid-point of the secondary condensing coils 176 near the top of the first tank 104, filling the regions therebetween. Then, as the secondary liquid 132 has completely boiled off, the primary liquid 128, which has a higher boiling point than the secondary liquid 132, boils creating the primary vapor 156 which migrates upward, all the while pushing the secondary vapor 164 upward as well. The primary vapor 156 will occupy the region above the liquid 124 in the first tank 104 and extending upward to about the mid-point of the primary set of condensing coils 172 in the first tank 104. A small region of overlap containing both primary and secondary vapors 156, 164 may exist near the upper portion of the primary set of condensing coils 172 in the first tank 104. The baffle condensing coils 188 in the vicinity of the opening 112 between the walls 116, 120 will cause any condensate of the primary and secondary liquids 128, 132 to fall back into the first tank 104, and will also prevent the primary and secondary vapors 156, 164 from migrating over into the second tank 108.

Although not shown, the primary and secondary sets of condensing coils 172, 176 may have associated troughs that collect the condensate as it drips off of the coils 172, 176, and returns the condensate back to the bottom of the tank 104. Otherwise, the condensate of the respective liquid 128, 132 collecting on the corresponding condensing coils 172, 176 will drip back down into the bottom of the tank 104, where it will be reboiled. A similar situation may be provided for in the second tank 108.

In a similar manner to the first tank 104, the heater 152, which may be electrically operated, in the second tank 108 continuously boils the liquid mixture 136 until the tertiary liquid 144 creates the tertiary vapor 168 that migrates upward to approximately the tertiary set of condensing coils 184 disposed near the top of the second tank 108, filling the regions therebetween. Once the tertiary liquid 144 has boiled off, the primary liquid 140, which has a higher boiling point than the tertiary liquid 144, boils and creates the primary vapor 160 in the second tank 108. This primary vapor 160 pushes the tertiary vapor 168 upward. The primary vapor 160 in the second tank 108 has an upper level that is at the approximate mid-point of the primary set of condensing coils 180 in the second tank 108. A small region of a mixture of primary and tertiary vapors 160, 168 is disposed at the upper portion of the primary set of condensing coils 180 in the second tank 108. Then, the tertiary vapor 168 is disposed in a region above the primary set of condensing coils 180 and extending upward to the tertiary set of condensing coils 184.

The baffle condensing coils 188, disposed in the vicinity of the opening 112 between the two tanks 104, 108, condense both the primary and secondary vapors 156, 164 in the first tank 104 and prevent these vapors 156, 164 from migrating over into the second tank 108, and direct any condensate thereof back into the first tank 104. The coils 188 also condense both the primary and tertiary vapors 160, 168 in the second tank 108 and prevent these vapors 160, 168 from migrating over into the first tank 104 and direct any condensate thereof back into the second tank 108.

The improved vapor phase soldering machine 100 of the present invention also includes a means for moving the printed circuit board 268 with the components 264 mounted thereon for soldering through the various vapor phases 156–168 of the machine 100. Such means may comprise a conveyor 280 that is well-known in the art. For example, the conveyor 280 may comprise any of those disclosed in U.S. Pat. Nos. 5,259,546, 4,692,114, 4,681,249, 4,676,069 and 3,904,102; all of which are hereby incorporated by reference. The conveyor 280 may be moved at a desired speed by motorized rolls 284 or other known driving means. In the alternative, the means for moving the printed circuit board 268 through the various vapor phases 156–168 may comprise other means, such as a basket 288 attached to a tether 292 that is moved either manually or automatically by well-known means.

In preparation for the soldering operation, the various leaded and leadless components and devices 264 that are to be soldered to one or more surfaces of a printed circuit board 268 at corresponding locations thereon are placed onto the circuit board 268 at these locations. These components 264 are placed onto solder paste that represents a hardened solder affixed to the circuit board 268 at various locations thereon. This solder paste, which typically comprises a solder mixed with a binding agent, such as a flux, may be applied to the surfaces of the circuit board 268 by any of a number of different techniques; for example, screen printing, stenciling, or dispensing the paste with a syringe. Once the paste is applied, the components 264 are placed onto the circuit board 268 on top of the solder paste at the appropriate location. The board 268 is then placed onto the conveyor 280.

Initially, the conveyor 280 moves the board 268 downward through the opening 256 at the top of the first tank 104 and into the secondary vapor 164. This secondary vapor 164, which is at a temperature lower than the temperature which would melt or reflow the solder paste, serves to preheat the board 268 and the components 264 thereon, to prevent any thermal shock thereto. The secondary vapor 164 heats the circuit board 268 and the components 264 through the principle of latent heat of vaporization in which the secondary vapor 164 condenses onto the circuit board 268 and components 264, thereby giving up its heat to the cooler circuit board 268 and components 264. In the process of doing so, the vapor 164 condenses onto the circuit board 268 and components 264. Such vapor phase heating is known to be one of the most efficient methods of heat transfer.

After a predetermined amount of time, the conveyor 280 moves the printed circuit board 268 out of the secondary vapor 164 and downward in the first tank 104 into the primary vapor 156. The primary vapor 156 is of a temperature that is at least equal to, and preferably somewhat greater than, the temperature at which the solder paste melts or reflows. The primary vapor 156 heats the board and components through latent heat of vaporization. The conveyor 280 then moves the printed circuit board 268 through the opening 112 in the wall 116, 120 between the two tanks 104, 108. Next, the conveyor 280 moves upward through the primary vapor 160 in the second tank 108 and into the tertiary vapor 168. In accordance with the present invention, this tertiary vapor 168 is at least equal to or near, but preferably less than, the ambient temperature of the atmosphere surrounding the second tank 108. For example, if ambient temperature in the facility where the soldering machine 100 is located and utilized is approximately 72° F., then the tertiary vapor 168 chosen may range from 35° F. to 80° F. If the ambient temperature is significantly different than 72° F., then the choice of tertiary vapor 168 may vary also in order to provide the proper cooling. This tertiary vapor 168 will instantly envelope the printed circuit board 268 and all of its components 264, through latent heat of vaporization, thereby providing for cool-down and solidification of the solder connections of the devices 264 to the board 268 within a 3–5 second time period. This rapid cool-down is similar to hand soldering or wave soldering, and is a vast improvement over the prior art vapor phase soldering machines 200, as exemplified in the aforementioned U.S. Pat. No. 3,904,102. Finally, the conveyor 280 moves the printed circuit board 268 out of the opening 260 of the second tank 108 where it can be removed from the conveyor 280.

The exposure time of the printed circuit board 268 and its associated components 264 within each vapor region 156–168 is determined by several factors; including the speed of operation of the conveyor 280, the size of the vapor phase regions 156–168, and the different size components 264 that are mounted to the printed circuit board 268. The component size is taken into account since different size components 264 have different or varying heat capacities.

The heater 148, 152 disposed in each tank 104, 108 has been described as being disposed within the actual liquid mixture 124, 136 at the bottom of each tank 104, 108. However, if desired, the heater 148, 152 may be disposed within the frame of the vessel 104, 108 itself, and not at all within the liquid. This is similar to that described in U.S. Pat. No. 4,676,069.

Figure 3:
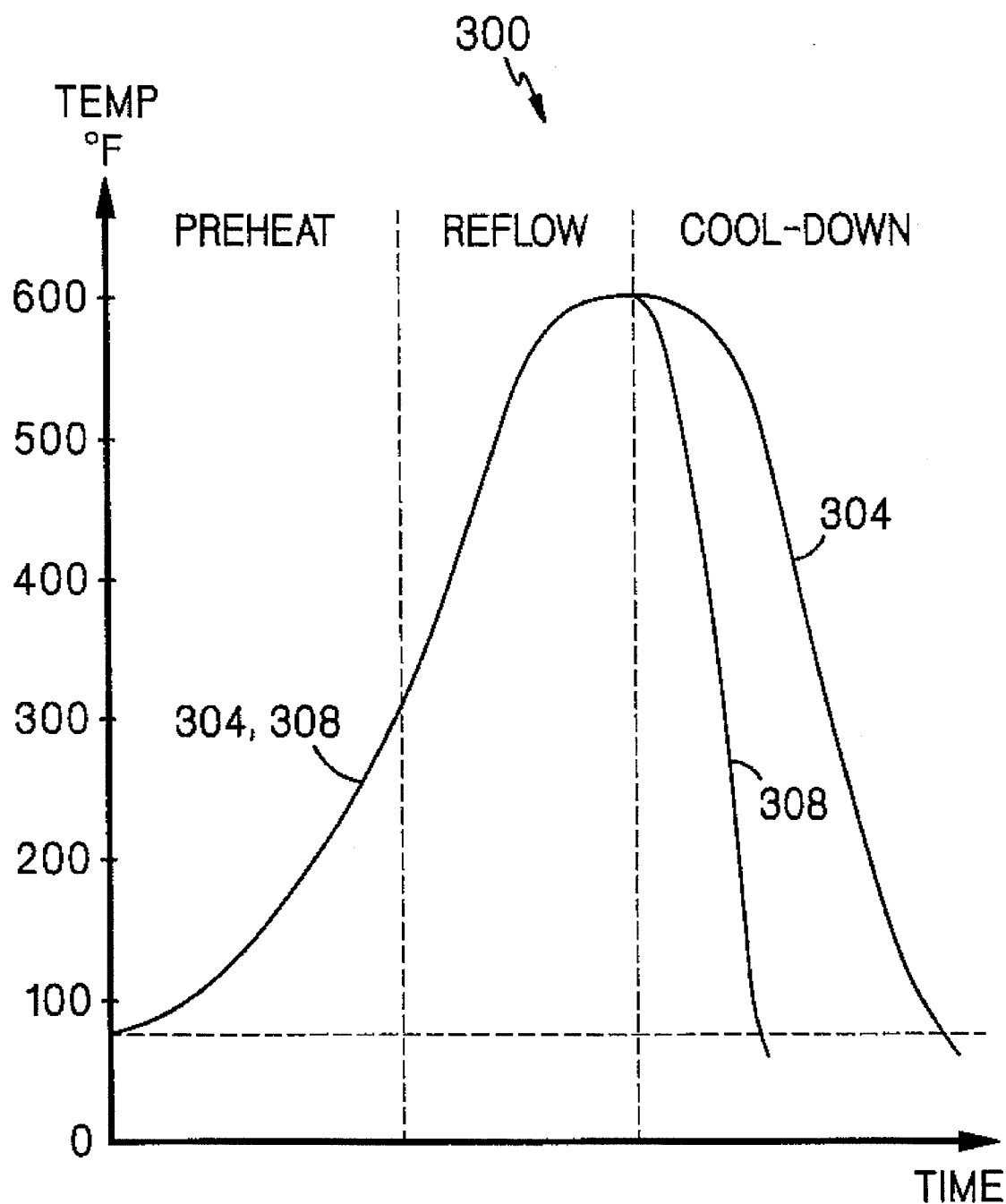
FIG. 3 is a graphical illustration of the difference in cool-down times of soldered connections produced by the prior art machine of FIG. 1 and that of the present invention of FIG. 2.

Referring to FIG. 3, there illustrated is a graph 300 of two curves 304, 308 illustrating typical temperature characteristics of soldered connections of the components 264 to the circuit board 268 as they are preheated, reflowed and cooled-down. The graph 300 includes a first curve 304 that indicates the prior art machine 200 of FIG. 1, in which the circuit board 252 follows a secondary vapor 232, primary vapor 228 and secondary vapor 232 cycle. The graph 300 also includes a second curve 308 that indicates the vapor phase soldering machine 100 of the present invention in which the soldered connections follow a secondary vapor 164, primary vapor 156, 160 and tertiary vapor 168 cycle. As can be seen, by passing the printed circuit board 268 through a tertiary vapor 168 upon exiting the primary vapor 160, instead of a secondary vapor 232 as in the prior art, cool-down of the soldered connections is achieved much more rapidly.

Figure 4:
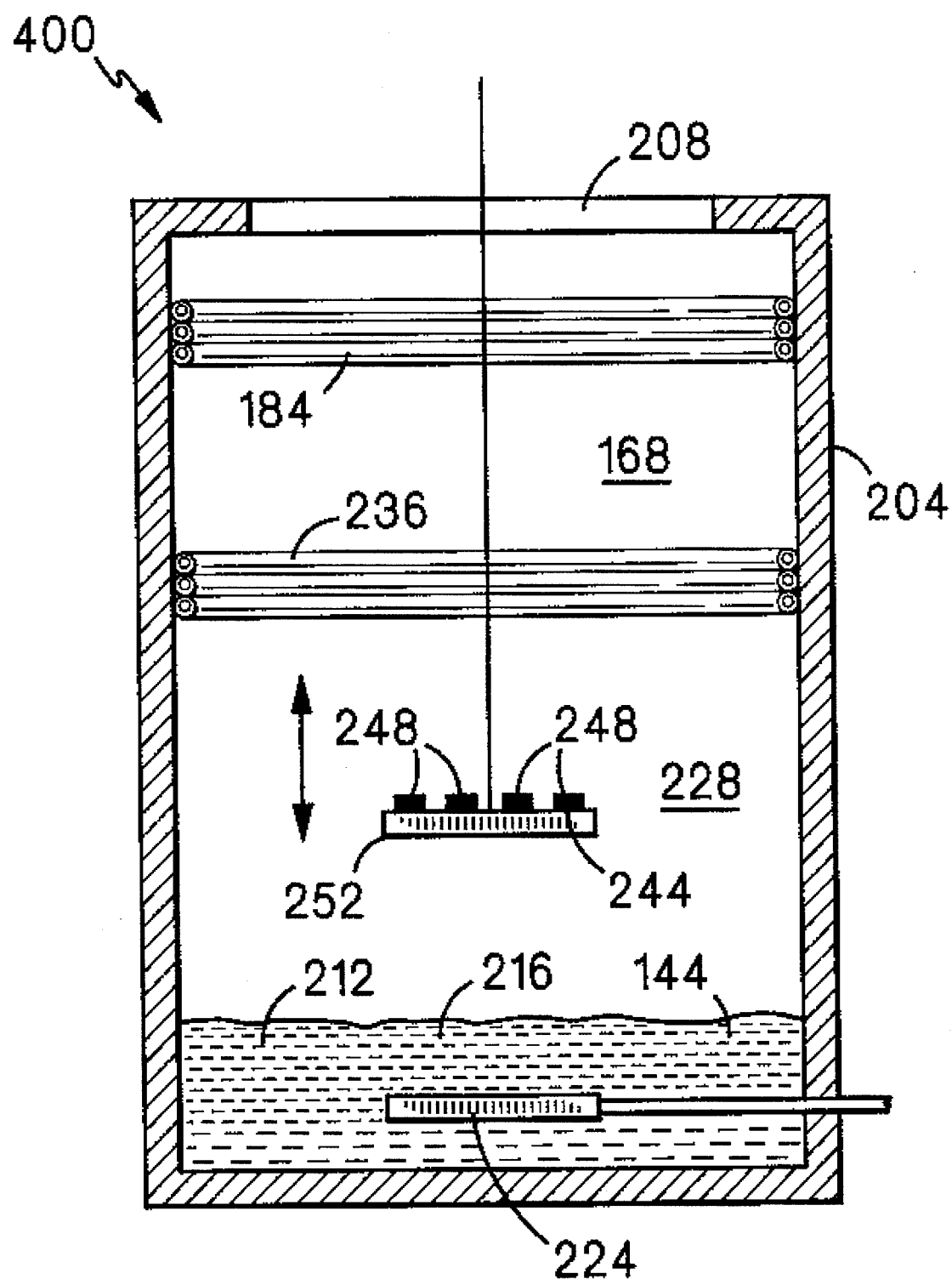
FIG. 4 is a partial cross-sectional illustration, in elevation, of an alternative embodiment of a vapor phase soldering machine in accordance with the present invention.

Referring now to FIG. 4, there illustrated is an alternative embodiment of the present invention. The vapor phase soldering machine 400 illustrated there is somewhat similar to the prior art machine 200 illustrated in FIG. 1. However, a major difference is that this embodiment utilizes an upper subsidiary vapor 168 in place of the secondary vapor 232 found in the prior art. The primary vapor 228 disposed below the subsidiary vapor 168 is similar to that in the prior art. Thus, the printed circuit board 244 with the components 248 thereon is initially lowered into a subsidiary vapor 168 which, because it is at room temperature or less, provides no preheating of the circuit board 244 and components 248. Then, the circuit board 244 is lowered into the primary vapor 228, which is hot enough to reflow the solder between the components 248 and the circuit board 244. Then, the circuit board 244 is raised upward into the subsidiary vapor 168 where it cools rapidly at a similar pace to the soldering machine 100 of FIG. 2. Thus, like reference numbers are used in FIG. 4 to illustrate similar elements of FIGS. 1 and 2. The only minor drawback to the alternative embodiment of FIG. 4 is that there is no preheating of the circuit board 244 and components 248 to thereby alleviate potential heat stress thereto. Nevertheless, the alternative embodiment of FIG. 4 may be suitable for those applications where preheating is not mandatory.

The present invention has been described as utilizing two tanks 104, 108 separated from each other by a wall or baffle 116, 120 having an opening 112 at a lower portion thereof. However, it is to be understood that this is purely exemplary. The broadest scope of the present invention contemplates any other embodiment utilizing two tanks or vessels 104, 108 that are separate from each other and that provides a path through the primary vapor 156, 160 for the circuit board 268 to be moved between the first tank 104 and the second tank 108.

Further, the present invention has been described as utilizing an exemplary structural configuration for the upper and lower portions of the ends of the wall 116, 120 at the opening 112. That is, the upper wall 116 has a drip cap 272 formed in it to prevent condensate from intermixing into the opposite tank 104, 108. Further, the bottom portion of the wall 120 has sloped surfaces 276 that also prevent the condensate from intermixing into the opposite tank 104, 108. However, such configuration is purely exemplary. It is to be understood that the broadest scope of the present invention contemplates other types of means for preventing the condensate from intermixing with that of the opposite tank 104, 108.

Still further, specific examples of primary, secondary and tertiary liquids 128, 132, 140, 144 have been disclosed. However, other liquids, commercially-available, may be utilized without departing from the broadest scope of the present invention. The liquids chosen depend primarily upon their boiling point, which, is also the temperature of the resulting vapor. It suffices that the primary vapor 156, 160 be of a temperature that is sufficient to melt or reflow the solder utilized. Since many different types of solders are typically utilized, and these solders have varying melting points, it follows that various types of liquids having different boiling points may also be utilized and are necessary.

It should also be noted the primary liquids 128, 140 in the two tanks 104, 108 may be the same liquid, or they can be different liquids. The baffle condensing means 188 serves to prevent the primary vapors 156, 160 from intermixing in the two tanks 104, 108. It suffices that the two primary liquids 128, 140 produce a vapor 156, 160, when boiled, that is of a temperature that is high enough to melt the solder. In the alternative, the primary vapor 156 in the first tank 104 may be as described hereinbefore, but the primary vapor 160 in the second tank 108 may instead have a vapor temperature that is similar to the vapor temperature of the secondary vapor 164 in the first tank 104; that is, the primary vapor 160 in the second tank 108 may not be hot enough to melt the solder this alternative embodiment depends upon whether the time spent by the circuit board 268 in the primary vapor 156 of the first tank 104 is long enough to melt the solder.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. Apparatus for heating an article, comprising:
   a. a first vessel adapted to contain a first quantity of a primary liquid in a first mixture with a secondary liquid;
   b. a second vessel adapted to contain a second quantity of the primary liquid in a second mixture with a tertiary liquid, the first mixture being separate from the second mixture;
   c. heating means for boiling the first mixture to produce a first primary vapor from the first quantity of a primary liquid and to produce a secondary vapor from the secondary liquid, and for boiling the second mixture to produce a second primary vapor from the second quantity of a primary liquid and to produce a tertiary vapor from the tertiary liquid, wherein the second vapor is disposed above the first primary vapor in the first vessel, and wherein the tertiary vapor is disposed above the primary vapor in the second vessel;
   d. an open fluid communication path between the first vessel and the second vessel; and
   e. baffle condensing means for preventing the secondary vapor from passing through the open fluid communication path from the first vessel to the second vessel, and for preventing the tertiary vapor from passing through the open fluid communication path from the second vessel to the first vessel.

2. The apparatus of claim 1, further comprising:
   a. first primary vapor condensing means, disposed in the first vessel at a predetermined elevation above the first mixture, for condensing the first primary vapor into the first quantity of the primary liquid;
   b. second primary vapor condensing means, disposed in the second vessel at a first predetermined elevation above the second mixture, for condensing the second primary vapor into the second quantity of the primary liquid;
   c. secondary vapor condensing means, disposed in the first vessel at a second predetermined elevation above the first mixture, for condensing the secondary vapor into the secondary liquid; and
   d. tertiary vapor condensing means, disposed in the second vessel at a second predetermined elevation above the second mixture, for condensing the tertiary vapor into the tertiary liquid.

3. The apparatus of claim 1, further comprising conveyor means for transporting the article on a path through the secondary vapor, the first primary vapor, the second primary vapor and the tertiary vapor.

4. The apparatus of claim 1, wherein a temperature of the first primary vapor is greater than a temperature of the secondary vapor.

5. The apparatus of claim 4, wherein a temperature of the tertiary vapor is less than the temperature of the secondary vapor.

6. The apparatus of claim 1, further comprising conveyor means for transporting the article on a path through the secondary vapor, the first primary vapor, the second primary vapor and the tertiary vapor, wherein the article when in the secondary vapor is heated to the temperature of the secondary vapor by latent heat of vaporization of the secondary vapor condensing onto the article, the article when in the first primary vapor is heated to the temperature of the first primary vapor by latent heat of vaporization of the first primary vapor condensing onto the article, and the article when in the tertiary vapor is heated to the temperature of the tertiary vapor by the latent heat of vaporization of the tertiary vapor onto the article.

7. The apparatus of claim 6, wherein the temperature of the first primary vapor is greater than the temperature of the secondary vapor, and wherein the temperature of the secondary vapor is greater than the temperature of the tertiary vapor.

8. The apparatus of claim 5, wherein the temperature of the tertiary vapor is no greater than an ambient temperature of air surrounding an opening of the second vessel.

9. The apparatus of claim 1, wherein the baffle condensing means comprises condensing coils operated at a temperature below a temperature of both the secondary vapor and the tertiary vapor.

10. The apparatus of claim 1, wherein the open fluid communication path between the first vessel and the second vessel is disposed below an upper level of the first primary vapor in the first vessel and below an upper level of the second primary vapor in the second vessel.

11. The apparatus of claim 1, wherein the heating means comprises a first heater for heating the first mixture, and a second heater for heating the second mixture.

12. A vapor phase soldering machine for soldering one or more surface mounted devices to a printed circuit board, each of the one or more surface mounted devices initially having a predetermined amount of a solder in a hardened form disposed between the surface mounted device and a predetermined location on a surface of the printed circuit board, the vapor phase soldering machine comprising:
   a. a first tank adapted to contain a first quantity of a primary liquid in a first mixture with a secondary liquid;
   b. a second tank adapted to contain a second quantity of a primary liquid in a second mixture with a tertiary liquid, the first mixture being separate from the second mixture;
   c. heating means for boiling the first mixture to produce a first primary vapor from the first quantity of a primary liquid and to produce a secondary vapor from the secondary liquid, and for boiling the second mixture to produce a second primary vapor from the second quantity of a primary liquid and to produce a tertiary vapor from the tertiary liquid, wherein the secondary vapor is disposed above the first primary vapor in the first tank, and wherein the tertiary vapor is disposed above the second primary vapor in the second tank;

d. an open fluid communication path between the first tank and the second tank;

e. baffle condensing means for preventing the secondary vapor from passing through the open fluid communication path from the first tank to the second tank, and for preventing the tertiary vapor from passing through the open fluid communication path from the second tank into the first tank;

f. conveyor means for transporting the printed circuit board on a path through the secondary vapor, the first primary vapor, the open fluid communication path between the first and second tanks, the second primary vapor and the tertiary vapor; and g. wherein the printed circuit board and the surface-mounted devices when in the secondary vapor are heated to the temperature of the secondary vapor by latent heat of vaporization of the secondary vapor condensing onto the printed circuit board and the surface mounted devices, the printed circuit board and the surface mounted devices when in the first primary vapor are heated to the temperature of the first primary vapor by latent heat of vaporization of the first primary vapor onto the printed circuit board and the surface mounted devices, the printed circuit board and the surface-mounted devices when in the second primary vapor are heated to the temperature of the second primary vapor by latent heat of vaporization of the second primary vapor onto the printed circuit board and the surface mounted devices, and wherein the printed circuit board and the surface mounted devices when in the tertiary vapor are heated to the temperature of the tertiary vapor by latent heat of vaporization of the tertiary vapor onto the printed circuit board and the surface mounted devices.

13. The vapor phase soldering machine of claim 12, further comprising:

a. first vapor phase condensing means, disposed in the first tank at a predetermined elevation above the first mixture, for condensing the first primary vapor into the first quantity of the primary liquid;

b. second primary vapor condensing means, disposed in the second tank at a first predetermined elevation above the second mixture, for condensing the second primary vapor into the second quantity of the primary liquid;

c. secondary vapor condensing means, disposed in the first tank at a second predetermined elevation above the first mixture, for condensing the second vapor into the second liquid; and d. tertiary vapor condensing means, disposed in the second tank at a second predetermined elevation above the second mixture, for condensing the tertiary vapor into the tertiary liquid.

14. The vapor phase soldering machine of claim 12, wherein a temperature of the first primary vapor and a temperature of the second primary vapor are both greater than a temperature of the secondary vapor, and wherein the temperature of the secondary vapor is greater than a temperature of the tertiary vapor.

15. A method of soldering one or more surface mounted devices to a surface of a printed circuit board, each of the one or more surface mounted devices initially having a predetermined amount of solder in a hardened form disposed between the surface mounted device and a predetermined location on the printed circuit board surface to form a stuffed printed circuit board, the method comprising the steps of:

a. moving the stuffed printed circuit board into a secondary vapor located in a first vessel, the secondary vapor being at a temperature greater than ambient and less than a temperature that would melt the solder;

b. moving the stuffed printed circuit board into a first primary vapor located in the first vessel, the first primary vapor being at a temperature sufficient to melt the solder;

c. moving the stuffed printed circuit board into a second primary vapor located in a second vessel through a fluid communication path between the first vessel and the second vessel; and d. moving the stuffed printed circuit board into a tertiary vapor located in the second vessel, the tertiary vapor being at a temperature that is no greater than an ambient temperature outside the second vessel.

16. The method of claim 15, further comprising the steps of:

a. heating a liquid mixture in the first vessel to form the first primary vapor and the secondary vapor, the liquid mixture comprising a first quantity of a primary liquid and a secondary liquid, the first quantity of a primary liquid when heated to its boiling point forming the first primary vapor, the second liquid when heated to its boiling point forming the secondary vapor; and b. heating a liquid mixture in the second vessel to form the second primary vapor and the tertiary vapor, the liquid mixture in the second vessel comprising a second quantity of a primary liquid and a tertiary liquid, the second quantity of a primary liquid when heated to its boiling point forming the second primary vapor, the tertiary liquid when heated to its boiling point forming the tertiary vapor.

17. The method of claim 16, further comprising the steps of:

a. condensing the first primary vapor into the first quantity of the primary liquid in the first vessel;

b. condensing the second primary vapor into the second quantity of the primary liquid in the second vessel;

c. condensing the secondary vapor into the secondary liquid in the first vessel; and d. condensing the tertiary vapor into the tertiary liquid in the second vessel.

18. The method of claim 17, further comprising the steps of:

a. condensing the secondary vapor into the secondary liquid in the first vessel at the fluid communication path between the first and second vessels to prevent the secondary liquid from intermixing into the second vessel; and b. condensing the tertiary vapor into the tertiary liquid in the second vessel at the fluid communication path between the first and second vessels to prevent the tertiary liquid from intermixing into the first vessel.

19. Apparatus for heating an article, comprising:

a. a vessel adapted to contain a mixture of a primary liquid with a subsidiary liquid, the primary liquid having a boiling point that equals a desired temperature of the article to be heated to, the subsidiary liquid having a boiling point at or below ambient temperature; and b. heating means for boiling the mixture to produce a primary vapor from the primary liquid and to produce a subsidiary vapor from the subsidiary liquid, the subsidiary vapor being disposed within the vessel on top of the primary vapor.

20. The apparatus of claim 19, further comprising:

a. primary vapor condensing means, disposed in the vessel at a predetermined elevation above the mixture, for condensing the primary vapor into the primary liquid; and b. subsidiary vapor condensing means, disposed in the vessel at a predetermined elevation above the primary vapor condensing means, for condensing the subsidiary vapor into the subsidiary liquid.

* * * * *